United States Patent [19]

Warriner et al.

[11] Patent Number: 5,303,349
[45] Date of Patent: Apr. 12, 1994

[54] INTERFACE FOR ESTABLISHING A NUMBER OF CONSECUTIVE TIME FRAMES OF BIDIRECTIONAL COMMAND AND DATA BLOCK COMMUNICATION BETWEEN A HOST'S STANDARD PARALLEL PORT AND A PERIPHERAL DEVICE

[75] Inventors: R. John Warriner, Amherst; Mark J. Lankarge, South Deerfield, both of Mass.

[73] Assignee: Valitek, Inc., Amherst, Mass.

[21] Appl. No.: 534,042

[22] Filed: Jun. 6, 1990

[51] Int. Cl.$^5$ .............................................. G06F 3/00
[52] U.S. Cl. .................... 395/275; 395/500; 364/238.3; 364/238.2; 364/260.1; 364/241.9; 364/DIG. 1
[58] Field of Search ............... 395/275, 500, 800, 200, 395/250

[56] References Cited

U.S. PATENT DOCUMENTS

| | | | |
|---|---|---|---|
| 4,016,548 | 4/1977 | Law et al. ........................... | 370/77 |
| 4,075,691 | 2/1978 | Davis et al. ........................ | 395/275 |
| 4,628,446 | 12/1986 | Hoffner, II ........................ | 395/275 |
| 4,641,263 | 2/1987 | Perlman et al. .................... | 395/500 |
| 4,807,121 | 2/1989 | Halford ............................. | 395/275 |
| 5,101,498 | 3/1992 | Ehlig et al. ........................ | 395/800 |
| 5,133,055 | 7/1992 | Lieberman et al. ................. | 395/275 |
| 5,187,795 | 2/1993 | Balmforth et al. ................. | 395/800 |
| 5,214,760 | 5/1993 | Hammond et al. ................. | 395/250 |

*Primary Examiner*—Thomas C. Lee
*Assistant Examiner*—Paul Harrity
*Attorney, Agent, or Firm*—Joseph S. Iandiorio

[57] ABSTRACT

A computer interface having time frame dependent functional designation of parallel port lines system. A communication cycle is established with a plurality of time frames for a group of parallel port lines. Discrete data bytes are transferred to and from a computer, during at least one of the time frames and data blocks are transferred, to and from the computer, during at least one other of the time frames. The designation of the parallel port lines is redefined during each of the time frames to accommodate the transfers to and from the computer of the discrete data bytes and data blocks. Discrete data bytes and data blocks to be sent and received are stored and this storing is conditioned as a function of the designation of the parallel port lines during each of the time frames.

21 Claims, 12 Drawing Sheets

TF1,TF2 4-BIT RETURN BUS CASE

FIG. 4

TF3 4-BIT RETURN BUS CASE

TF4 4-BIT RETURN BUS CASE

FIG. 7

TF5 4-BIT RETURN BUS CASE

FIG. 9

TF1, TF2 8-BIT RETURN BUS

FIG. 10

TF3 8-BIT RETURN BUS CASE

FIG. 11

TF4 8-BIT RETURN BUS CASE

FIG. 12

TF5 8-BIT RETURN BUS CASE

FIG. 13

INTERFACE FOR ESTABLISHING A NUMBER OF CONSECUTIVE TIME FRAMES OF BIDIRECTIONAL COMMAND AND DATA BLOCK COMMUNICATION BETWEEN A HOST'S STANDARD PARALLEL PORT AND A PERIPHERAL DEVICE

FIELD OF INVENTION

The invention relates to a parallel port computer interface and more particularly to a system that allows two-way parallel communication with a wide range of personal computers through a standard parallel printer port.

BACKGROUND OF INVENTION

A growing need in the area of microcomputers is the ability to communicate with peripheral devices and other computers at a high rate of speed and while transferring large amounts of data to and from the microcomputer. To communicate effectively at high speed, it is desirable to transfer eight or more parallel bits of information simultaneously.

A problem with developing a standard product to communicate in parallel is that, although many microcomputers contain functionally similar operating systems, their hardware may differ as well as their physical size and configuration, and, thus, the addition of a standardized parallel communications circuit board to the main computer board is almost impossible. As such, a product may have to rely on auxiliary communications ports, if they even exist, which also may not work in a standardized manner, and further, may not reliably function or possess the necessary speed. In the alternative, a product, to achieve standardization, must rely on the slowly operating serial port available on most microcomputers for input and output of data.

However a data port that is universally available in a standard configuration in microcomputers is the parallel printer port. This port also possesses the desired speed. A problem with this printer port still arises in that it is not designed for full eight and nine bit parallel communication. Although a sufficient number of bits are available for transfer of data from the microcomputer, generally an insufficient number of lines exist for data transfer into the microcomputer. Although some lines may be bidirectional, allowing two way data transfer, an insufficient number of bidirectional lines can be relied upon to exist in a standard number and format in all computers. Thus, the use of bidirectional lines is limited in a standardized product.

To properly carry out a communication function in two directions requires more than eight lines per direction, in fact, at least ten lines must be dedicated (eight data bits as well as parity and synchronization bits) to each direction. The standard parallel port, however, contains only seventeen active lines, few of which may be relied upon as bidirectional.

Other products have attempted to circumvent the problems of having too few lines in the desired direction on the parallel port, by omitting necessary error checking and handshake functions such as parity checking. Such attempts have, thus, inevitably resulted in a significantly unreliable product.

SUMMARY OF INVENTION

It is therefore an object of this invention to provide a system for interfacing communications through a standard microcomputer parallel port to transfer bytes of data to and from a computer in parallel.

It is a further object of this invention to provide a system that operates on a great variety of available microcomputer models.

It is a further object of this invention to provide a system with high reliability using data transmission error checking techniques.

It is a further object of this invention to provide a system that operates at high speed in transmitting data.

It is a further object of this invention to provide a system that allows for storage of blocks of data transmitted to and from the computer.

This invention results from the realization that a truly effective parallel port computer interface system can be achieved by controlling the designation of the available parallel port lines in different time frames which relate to the desired data transfer operation, and by conditioning a storage buffer to send and receive data blocks to the lines directly, relative to each time frame.

This invention features a parallel port interface system. There are means for establishing a communication cycle of a plurality of time frames for a group of parallel port lines. There are means for transferring, during these time frames, discrete data bytes to and from a computer during at least one of the time frames and data blocks during at least one other of the time frames. There are, further, means for redefining the designation of the parallel port lines during each of the time frames to accommodate transfers to and from the computer of the discrete data bytes and to and from the computer of the data blocks. There is included a means for storing the discrete data bytes and the data blocks to be sent and received, as well as a means for conditioning the means for storing as a function of the designation of the parallel port lines during each of the time frames.

In a preferred embodiment, the means for redefining the designation of the parallel port lines additionally includes means for designating the parallel port lines to allow discrete data bytes, representative of a plurality of system commands to be sent to and from the computer to validate commands for correctness and synchronize between the computer and the interface system. This means for redefining may further include means for defining the parallel port lines to allow discrete data bytes to be sent from the computer. Also included with the means for redefining may be means for enabling the parallel port lines to allow discrete data bytes to be sent to the computer, as well as means for dedicating the parallel port lines to allow data blocks to be sent from the computer and means for resolving these parallel port lines to allow data blocks to be sent to the computer.

The means for transferring discrete data bytes and data blocks may further include means for transmitting discrete data bytes and receiving, to check for transmission errors, an echo of the same discrete data bytes during the same time frame and over the same parallel port lines. This means for transmitting may also include means for multiplexing some of the parallel port lines carrying one of the discrete data bytes, and the echo of this same discrete data byte, to allow transmission on fewer lines.

The means for redefining may, furthermore, include at least one of the parallel port lines to carry parity bits relative to data blocks transmitted from the computer.

The means for transferring may include a means for specifying a line to carry echo parity bits in response to and relative to a transfer of data blocks to the computer. This means for specifying may include a means for generating echo parity bits in response to and relative to a transfer of data blocks to the computer, as well as a means for determining whether the transmission of data blocks was correct based upon the echo parity bits.

The system, according to this preferred embodiment, may include at least one host computer and at least one independent central processing unit.

The means for conditioning the means for storing may include means for inputting into storage successive bytes of data blocks directly from the parallel port lines, as well as means for outputting from storage successive bytes of data blocks directly onto the parallel port lines. This means for outputting may also include means for dividing bytes of data blocks to allow multiplexing of some of the parallel port lines, carrying data blocks to the computer, to allow transmission on fewer lines.

The means for storing may further include dynamic random access memory (RAM) means, and the means for conditioning these means for storing may include RAM control means. This means for conditioning may also include means for addressing nine bits of both rows and columns of random access memory addresses in response to the RAM control means. Additionally, the means for conditioning may include means for latching discrete data bytes and bytes of the data blocks to regulate the timing of their transfer between the parallel port lines and the means for storing.

Finally, the means for redefining the designation of the parallel port lines may further include means for delineating lines to carry command and data strobe signals to provide an interactive handshaking function between the interface system and the computer.

DISCLOSURE OF PREFERRED EMBODIMENT

Other objects, features and advantages will occur to those skilled in the art from the following description of a preferred embodiment and the accompanying drawings, in which.

Figure 1:
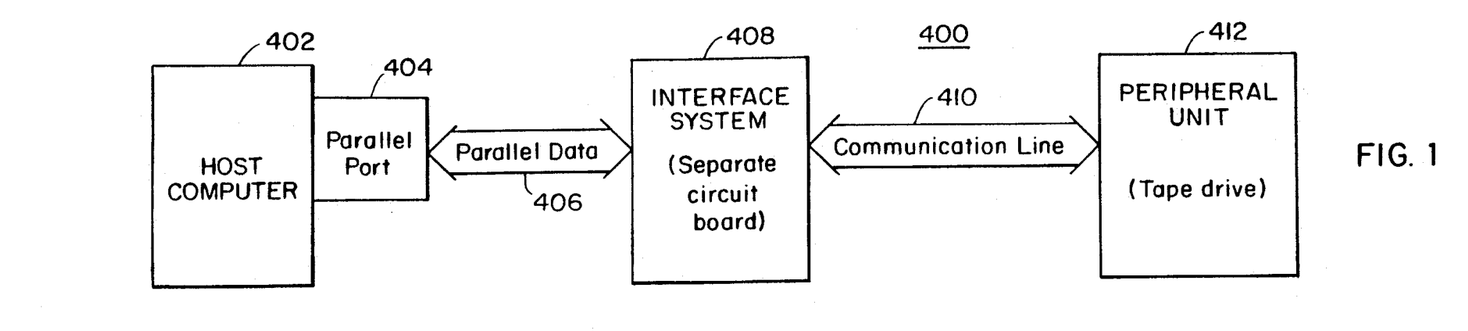
FIG. 1 is a block diagram of a parallel interface system with host computer and peripheral device according to this invention.

The structure of this invention generally follows the block diagram 400 form depicted in FIG. 1. A host computer 402 with a parallel port 404, generally utilized for printer interface, is connected via a parallel data line 406 to an interface system controller board 408. This board contains the hardware and system controlled software necessary to carry on interactive communication with the host computer. The interface board itself allows communication with a predetermined peripheral device, which in this example is a tape drive 412. The interface board basically allows data to pass between the computer and peripheral and also controls the peripheral device through its communications lines 410 to send and receive data.

The invention allows effective, error free, two way communication over an otherwise limited number of parallel port lines through the designation of two or more time frames in which the software of the interface system and the software of the host computer read the data sent over the parallel lines in a predetermined manner. Thus, for each interval a different interpretation of the data transferred over the lines is recognized by the software and each different interpretation is classified as a different time frame exists. In this example there are five such time frames. As will be described below, there are also certain hardware changes that occur at the direction of the software program for the routing of line data for each time frame. Thus, certain active circuitry is utilized in some time frames and not in others. The flow chart of FIG. 2 outlines the general operation of a software program operating in both the interface system board and the host computer. Both the system's Central Processing Unit (CPU) and the host computer's software initialize with a general reset of states 1000. The system will then designate the lines such that a reading of a discrete byte of data will occur between the system and the host computer 1002. This initial Time Frame 1 is utilized to validate the correctness of the system command underlying the information contained in the discrete data byte transferred. At this time the systems of the CPU and the host computer also synchronize their operations to both perform the same data operation.

Figure 2:
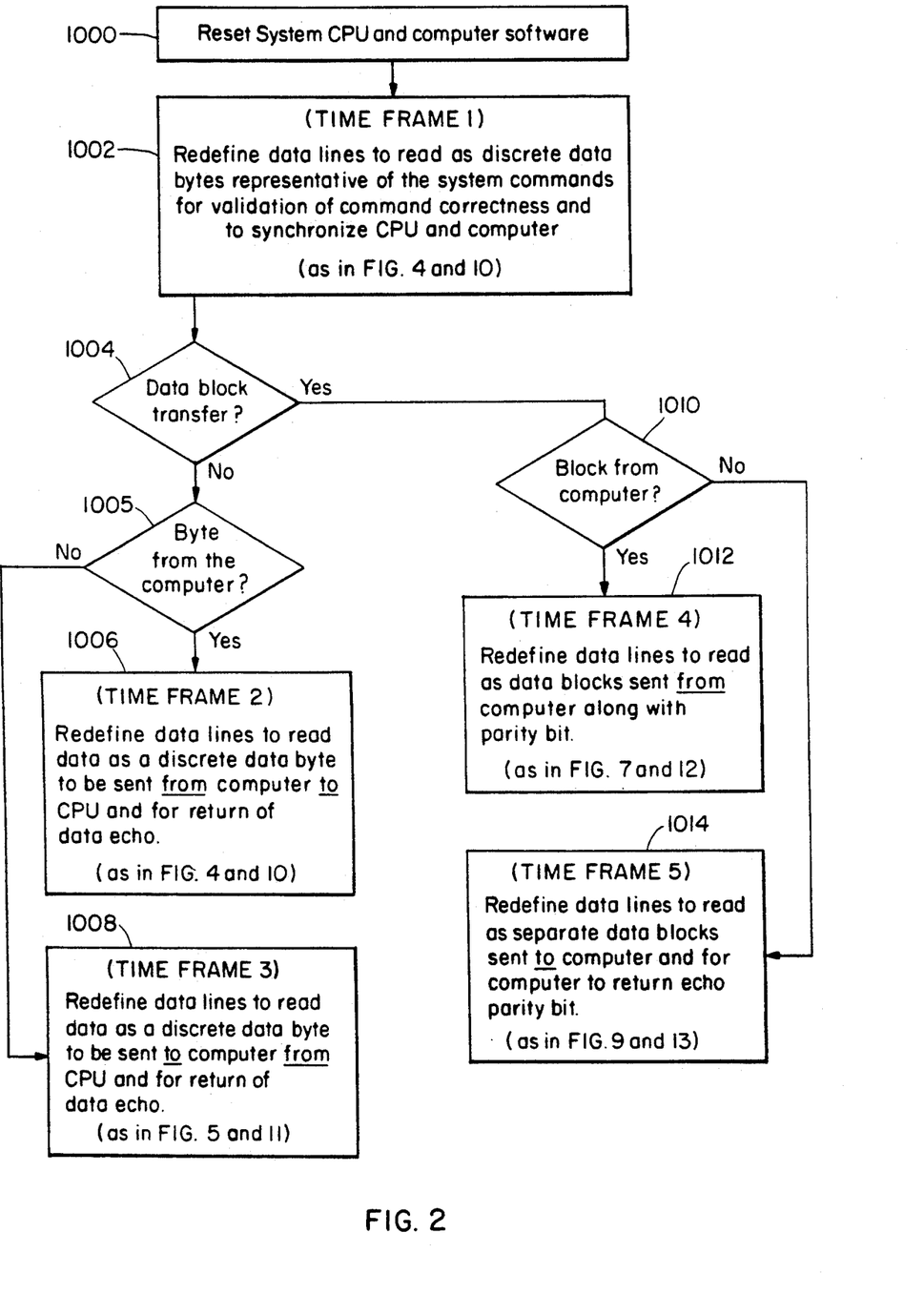
FIG. 2 is a flow chart of the software designation of time frames for the interface system of FIG. 1.

The software then decides if a block transfer is to occur 1004. If not, then a discrete data byte is to be transferred. The software must then decide 1005 if it is a transfer to occur from the computer 1006 (Time Frame 2), or to the computer 1008 (Time Frame 3). In either event it decides to read the lines to interpret the data on the lines in a manner consistent with the time frame designation. To error check the system the software also interprets a return of data in the opposite direction as an error checking echo of the data initially received.

Assuming a data block transfer is to be accomplished 1010 instead of discrete bytes, the computer determines whether the block is to be transferred from the computer 1012 (Time Frame 4), or to the computer 1014 (Time Frame 5). If data is sent from the computer, the information on the lines is interpreted to be read as a data block transfer including a parity bit. If, however, data is read as a transfer of a data block to the computer, then an oppositely travelling line is read to be a return echo of a parity bit. The reason for this return parity is the existence of a limited number of return lines as described further below.

Focusing now on the hardware aspect of the system, as referred to above the software designates a number of time frames, of parallel line designation, in which specific data transfer operations requiring specific activation of hardware to achieve the proper routing of data.

Figure 3:
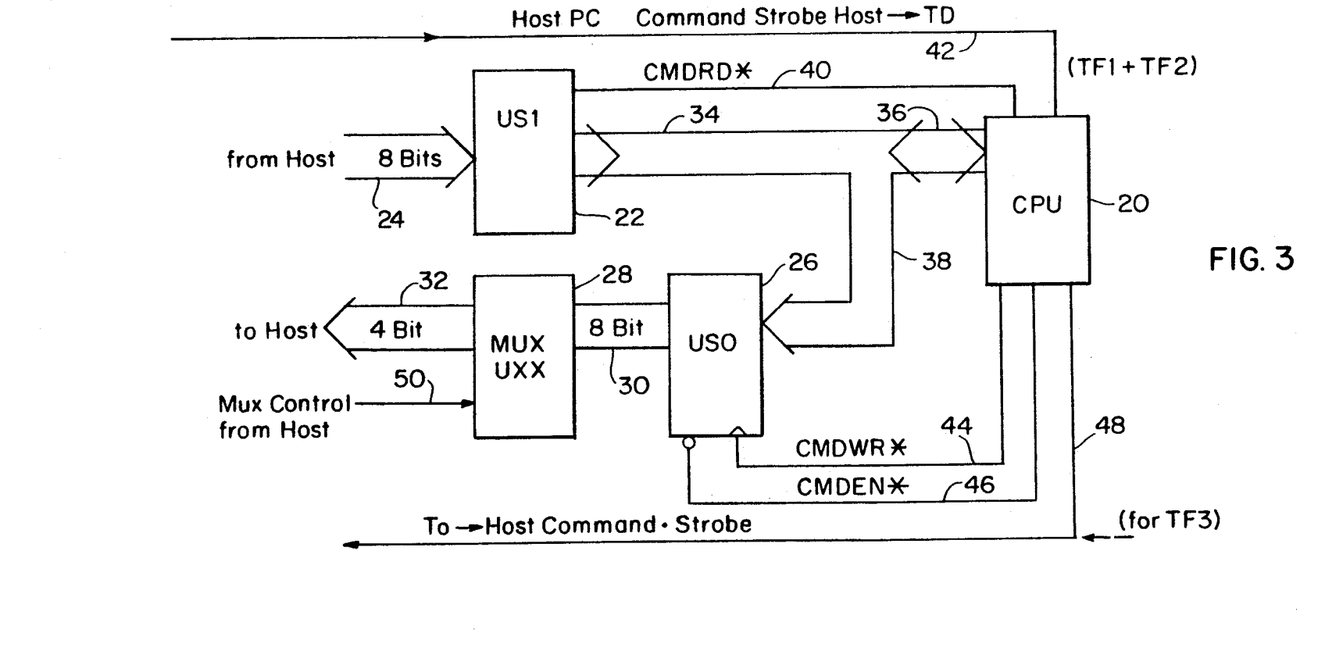
FIG. 3 is a block diagram of the active circuitry for discrete data byte communication in the time frames involving command validation and synchronization (Time Frame 1), byte transfer from the computer (Time Frame 2) and byte transfer to the computer (Time Frame 3)

Data transferred by the parallel port lines generally takes the form of bytes forming larger data blocks, and discrete data bytes generally containing command instruction information for data manipulation. In a preferred embodiment the system designates three distinct time frames for discrete data byte transfer. FIG. 3 discloses the active circuitry enabled by the software to implement the time frames entitled Time Frames 1, 2, and 3. Since discrete data bytes are, in this example, the basis for command instructions, the data busses shown are routed to and from the CPU 20. A byte of parallel data is input over an 8 bit data bus 24 from the host computer. This byte is present at the input of the buffer 22 and is read by the CPU when it asserts a read command signal 40 allowing the byte to exit onto the input bus 34 and 36 to the CPU. The read command signal is asserted by the CPU in response to a command strobe signal 42 sent over the parallel lines from the host computer. The CPU is programmed to recognize this strobe as an indication of a command or data byte transfer in each of Time Frames 1 and 2. The CPU asserts the return command strobe 48 to initiate a command or data byte transfer to the host computer in Time Frame 3.

The CPU will process the byte it receives and perform a data manipulation task in response to the specific information coded in the byte.

In order to confirm that the byte was transferred by the host computer the CPU will return, over 8 bit data busses 36 and 38, an echo of the discrete byte it has received. This byte will be sent to an 8 bit latch 26 that has been activated with a latch command 44 that allows the 8 bit information to be stored. The CPU will always simultaneously signal the latch with an enable command 46 to release the information for transmission to the host computer on 8-bit bus 30. Initially the computer attempts to communicate using 8-bit mode or (2×) 4-bit multiplexed for speed. Depending upon the capability of the computer parallel port, if an 8-bit return bus fails, the CPU instructs the Tape Drive Controller to change modes to 4-bit mode to achieve compatibility. In this example, since only 4 bits are available for data return through the parallel port, a multiplexing operation must occur. Thus, the bus 30 interconnects with a multiplexer 28 that allows the upper 4 bits and lower 4 bits of a byte to be transmitted in succession down the same 4 bit line 32 back to the host computer. The switching between upper and lower 4 bits is controlled by high and low values of a multiplexer control signal 50 transmitted from the host computer.

This host to system command and system to host echo transmission, is carried out in Time Frames 1 and 2 of the example shown. Time Frame 1 consists of command validation and synchronization in which the correctness of a given command is confirmed by the system and the system is then synchronized, forming the proper logic states to match those simultaneously present in the host computer.

Time Frame 2 may consist of the actual transfer of the data by the host computer to the system as may be required to perform a chosen command or other function.

Figure 4:
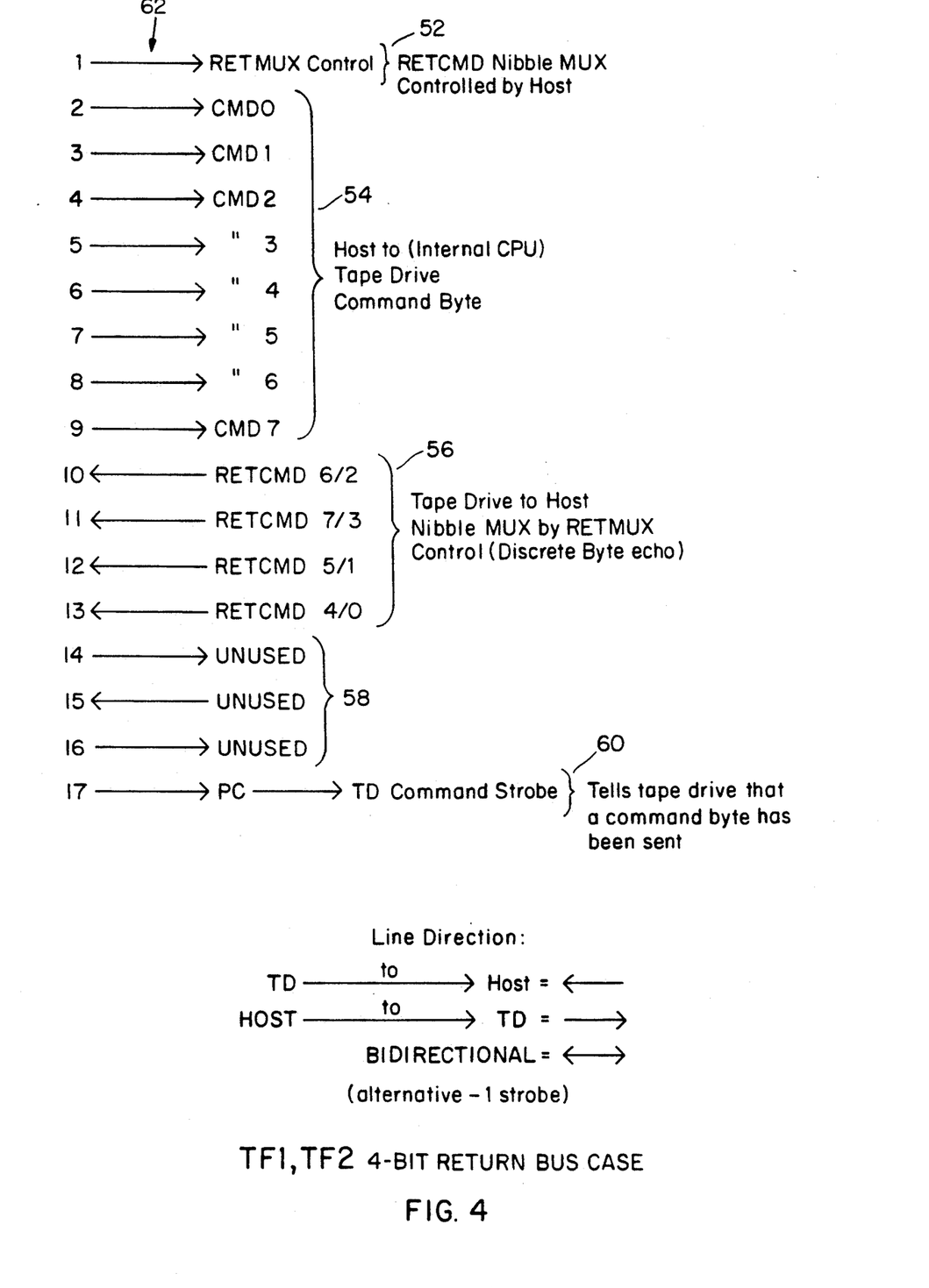
FIG. 4 is a diagram of the parallel port line designations for discrete data byte transfer in time frames 1 and 2 described in FIG. 3 for the 4-bit return bus case.
Figure 10:
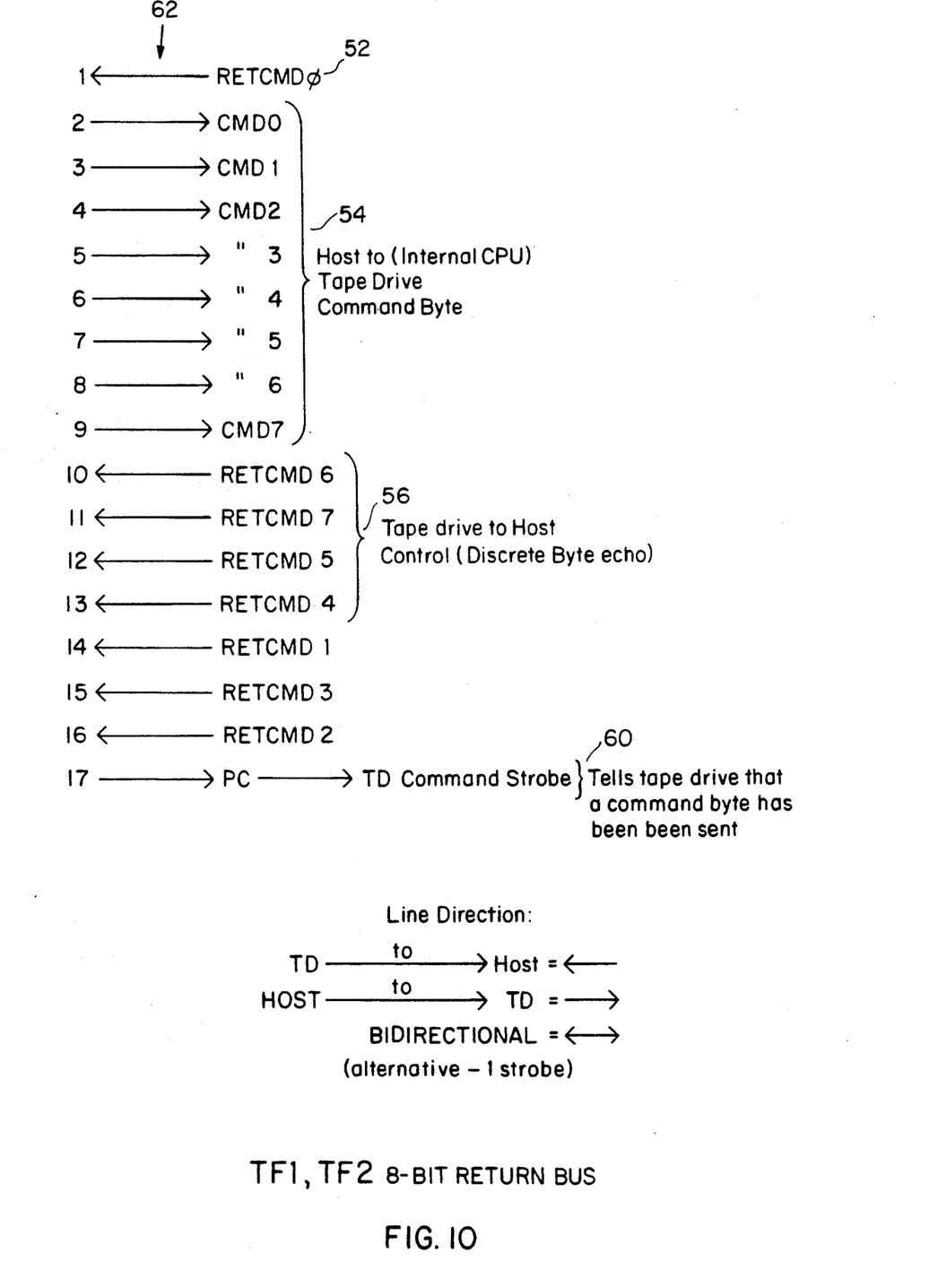
FIG. 10 is a diagram of the parallel port line designation for discrete data byte transfer in time frames 1 and 2, described in FIG. 3, for the 8-bit return bus case.

Both these time frames involve the transfer of a byte of data from the host computer to the system and the line designations are similar for the two. These designations are depicted in FIG. 4 for the 4-bit return bus case and in FIG. 10 for the 8-bit return bus case. The command bits 54 are transferred from the host to the system, which in this example contains a tape drive peripheral, over lines 2-9. The return echo 56 of 4 upper and 4 lower bits is returned from the system to the host computer over lines 10-13 for the 4-bit return bus case. The upper and lower 4 bits are multiplexed and returned on the command of the return multiplexer control signal 52 sent from the host computer on line 1. Lines 14, 15 and 16 are unused 58 for the 4-bit return bus case and the command strobe 60 for informing the CPU of the transmission of a discrete data byte is located on line 17. The arrows 62 describe the generally standardized internal hardware directional designation for each of lines 1-17. Those pointing to the right are lines that may only send from the computer. Those pointing to the left are those that may only send to the computer and those pointing both directions may send either to or from the computer.

FIG. 3 further discloses circuitry that is also utilized in Time Frame 3 of this example. Generally, it matches that of Time Frames 1 and 2, except now, discrete data byte information initiates within the system CPU and must be sent to the host computer. For the computer to recognize this transmission a return command strobe signal 48 must first be transmitted to it. Following the command strobe, a discrete data byte is transferred in two 4 bit multiplexed parts, in the same manner as the return echos of Time Frames 1 and 2, over the designated return data lines. A similar return echo for error correcting purposes may be sent over the 8 bit input bus 24 from the host computer.

Figure 5:
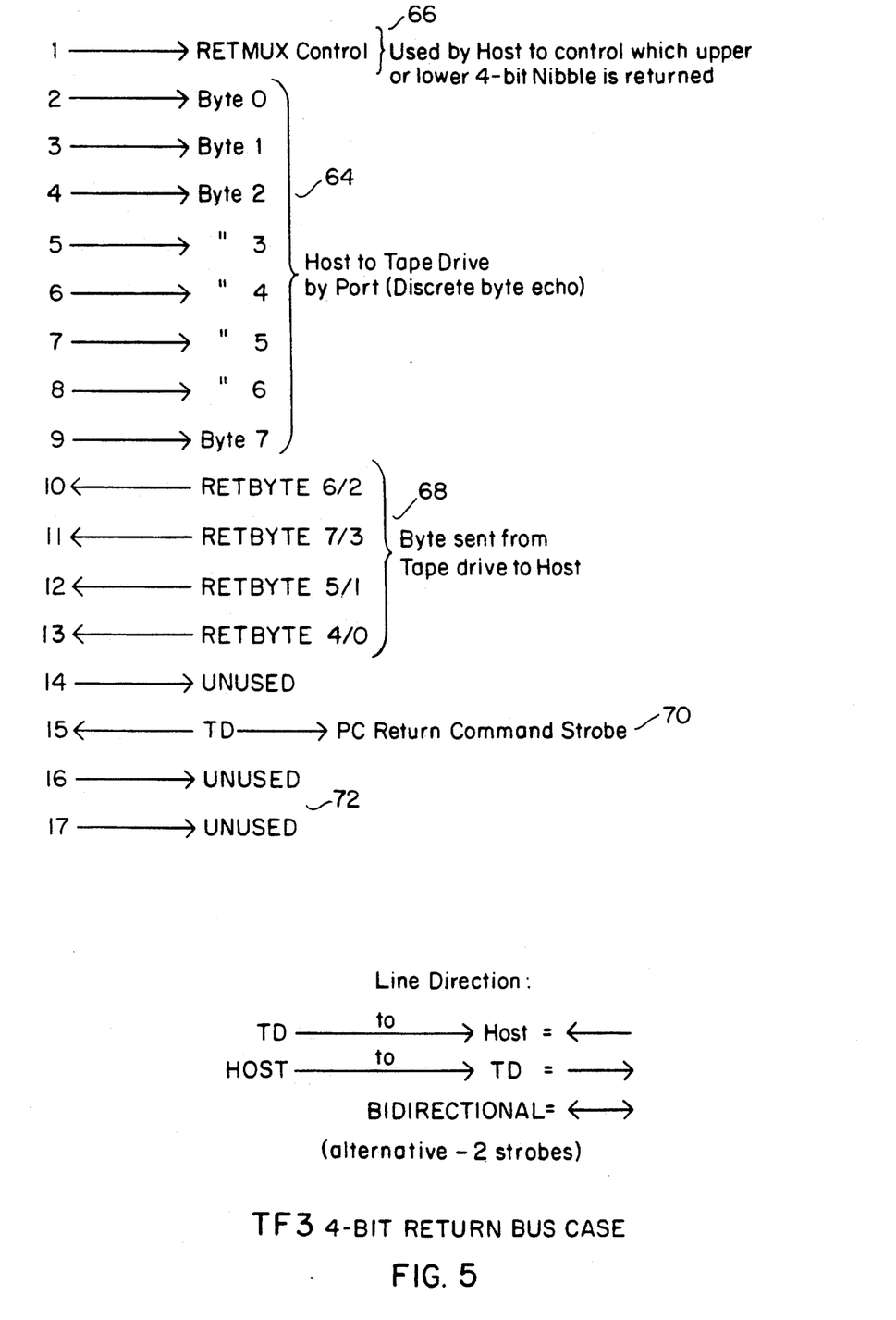
FIG. 5 is a diagram of the parallel port line designations for discrete data byte transfer in time frame 3 as described in FIG. 3 for the 4-bit return bus case.
Figure 11:
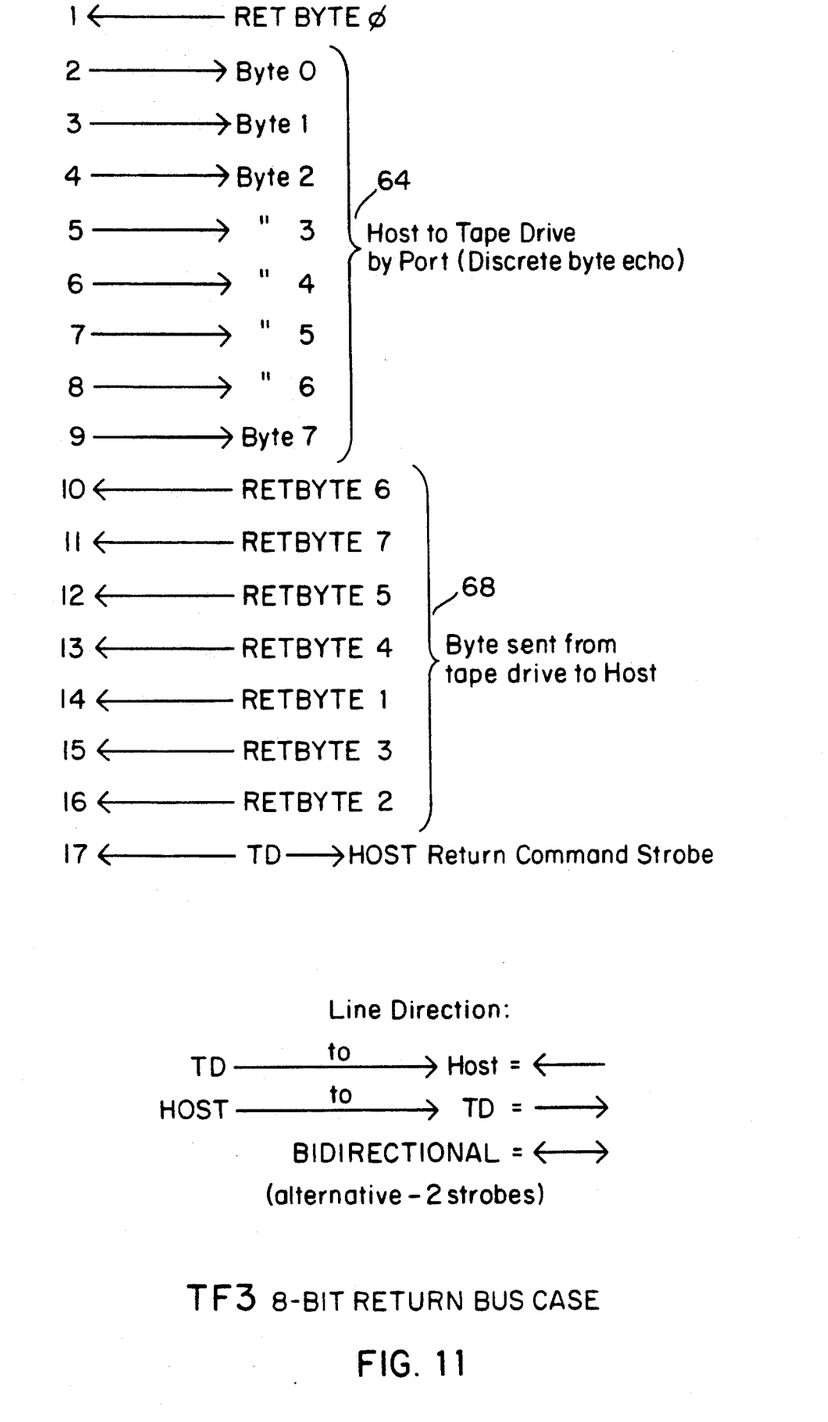
FIG. 11 is a diagram of the parallel port line designations for discrete data byte transfers in time frame 3, as described in FIG. 3, for the 8-bit return bus case.

FIG. 5 and 11 describes the line designations necessary to implement Time Frame 3 data transfer for the 4-bit and 8-bit return bus cases, respectively. The purpose of each line is similar to that of Time Frames 1 and 2. A new designation is created for line 15, the return command strobe 70 from the system to the host computer for the 4-bit return bus case. In the 8-bit return bus case the return command strobe 72 is on line 17. This function utilizes a line committed by the internal hardware to transmission into the computer. The primary difference between Time Frames 1 and 2 and Time Frame 3 arises not only from line designations, but also from timing of transmissions. The 8 bit lines from the computer to the system 64 now act as returns for an error correcting echo rather than an initial data transfer bus. In this time frame the multiplexed return lines 68 send the initial data. Multiplexed lines 10-13 are used for the 4-bit return bus case and lines 1, 10-16 are used for the 8-bit return bus case. In the 4-bit return bus case, the computer to system command strobe 72 is unused and the return multiplex control signal 66 is, similarly to Time Frames 1 and 2, also controlled by the host computer. Control is thus performed by a line responsive to the computer's internal software.

One of the primary functions of the parallel port system is the transfer of larger blocks of data with sufficient speed to and from the computer. To accomplish this task, the system defines Time Frame 4 for transmission of data from the host computer to the system and Time Frame 5 for transfer of data to the host computer from the system. The system itself contains a random access memory buffer that stores blocks of data transferred between the host computer and a peripheral device, such as the tape drive used in this example. The buffer allows data to be transferred and manipulated in easily read, written and organized blocks. This minimizes the damage caused by transmission errors since a block of data is only sent to the peripheral device after it has been completely received and verified to be error free. The data is organized in blocks and each block can be error checked and retransmitted if necessary. A controller interfaced with the system could allow the data blocks, once buffered, into and out of a peripheral unit.

Figure 6:
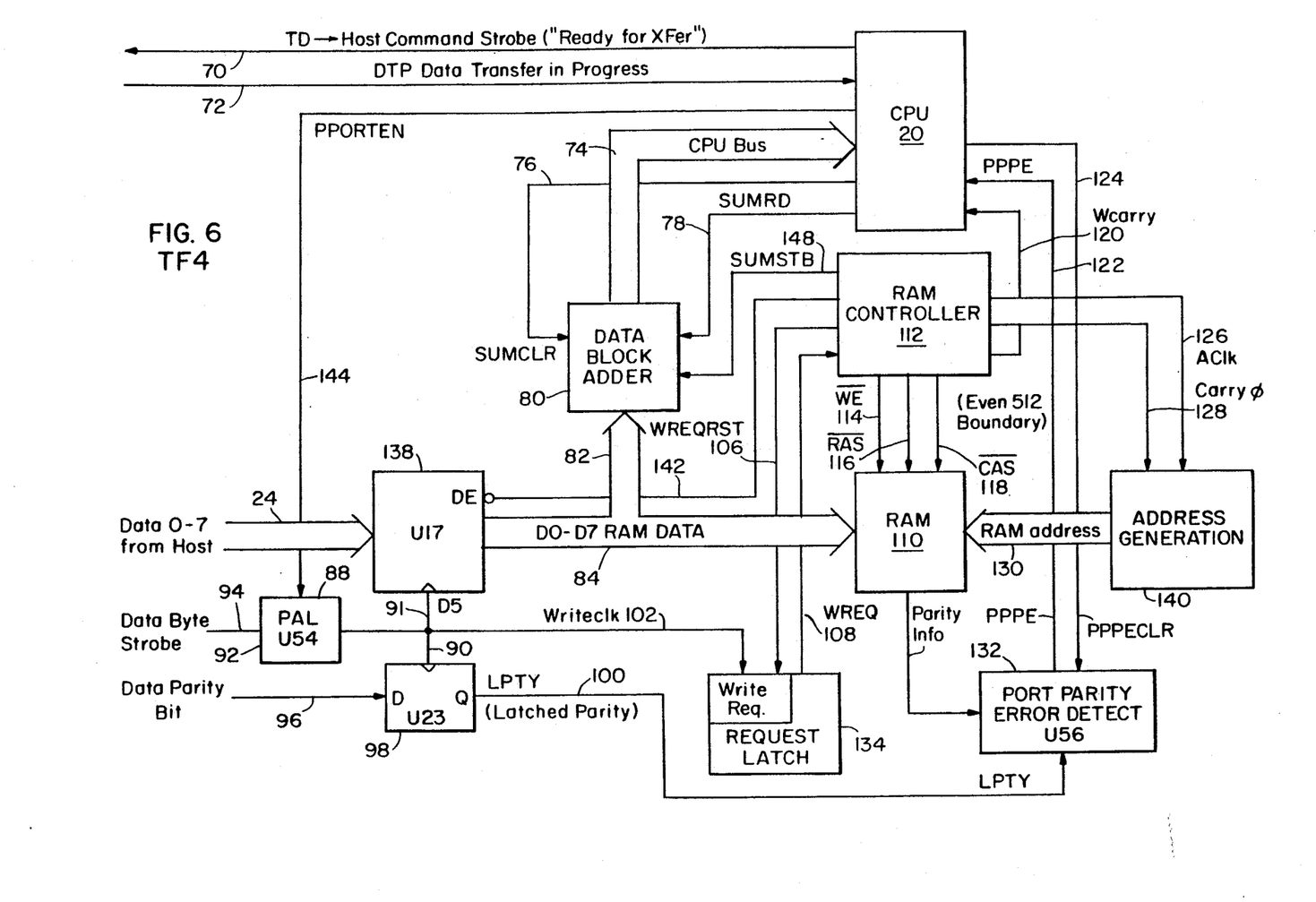
FIG. 6 is a block diagram of the active circuitry for data block communication in the time frame involving data block transmission from the computer (Time Frame 4)

In order to enhance the data block transfer speed of the system, the architecture is designed to create the necessary environment in advance for a large scale parallel data transfer, without any intervening processing, directly between the computer and the system's internal storage memory. The circuitry required to implement this computer-to-system transfer is shown in FIG. 6. In this example, a Time Frame 4 implementation would begin with the CPU 20 floating the outputs of latch 26 of FIG. 3 by setting the command enable signal 46 high. The CPU would then, referring to FIG. 6, clear the parallel port parity error detector 132 to prepare for error checking on a new block of data using a clear signal 124. The block error checking 8 bit adder 80 for adding the data bytes in the block is then cleared with a separate CPU clear signal 76. The CPU then sends a signal 144 to enable a programmed array logic 92 to read the data byte strobe signal 94 sent from the computer. When the data byte strobe signal is received it signifies that the computer has sent a byte of data. As such, the programmed array logic 92 sends a write clock signal 102 to the request latch 134 which holds a write request that is subsequently read in response to a write request signal 108 by the random access memory (RAM) controller 112. The RAM controller controls whether the RAM 110, which is responsible for the storage of data blocks to be transferred, is in read, write or refresh mode. In Time Frame 4, the write request from the computer places the RAM into write mode, thus allowing it to receive data from the computer directly, without a need to route data through the CPU.

Once the necessary preparation for data writing to RAM 110 has been performed, the CPU 20 asserts the system to host command strobe 70 low. The "system" in this example is designated by TD, a tape drive peripheral. This command signals the host computer that the system is ready to receive a data transfer. The host computer, in response, asserts a data transfer in progress signal 72 low to signal the CPU that transfer of a data block is commencing. The host then transmits a block consisting of 512 data bytes in succession over the 8 bit parallel data line 24. Each of these bytes is accompanied by a parity bit from the host transferred over its own parity line 96. The RAM controller 112 asserts an enable signal 142 that activates a latch 138 at the end of the parallel data bus 24. The data byte strobe 94 which is now enabled by the programmed array logic 88 clocks the latch 138 each time one of the 512 data bytes is transferred, allowing that byte to pass through a data bus 84 into the RAM 110. Each byte is placed at a successive address in the RAM that has been generated by a 9 bit address generator 140 operating in response to clocking signals 126 and 128 generated by the RAM controller 112 at the same time the controller strobes the data latch 138. Through the entire process, a write enable signal 114 is generated by the RAM controller to allow the RAM to store the successive data bytes.

The RAM controller also simultaneously clocks, by a storbe signal 148, the data block adder circuit 80 responsible for error checking. This circuit is connected by a parallel line 82 to the RAM data bus 84 and receives the same byte as delivered to RAM 110. All bytes are summed and that sum is later transferred by a parallel CPU bus 74 to the CPU 20. The parity bit is also transferred to a latch 98 which, in response to a clock signal from the enabled data byte strobe 90, transfers its value via a line 100 to a port parity error detection circuit 132.

The system continues the data writing process until the entire block has been transmitted by the host computer. At this time the host asserts the data transfer in progress signal 72 high signifying the end of the data block. In response, the CPU will signal the programmed array logic to deactivate the data byte storbe which disengages the data, parity and RAM write signals.

The CPU then reads the carry signal 120 of the RAM controller which goes to a high value only if exactly 512 bytes are received. If not, the CPU detects an error.

The CPU then reads the block sum adder 80 via parallel CPU bus 74. A predetermined sum is compared to the sum received from the adder. If these two amounts are not equal, then the CPU again enters an error mode.

Finally, the CPU reads the parallel port parity error detection circuit signal 122 which, if high, indicates a byte transmission error, which again places the CPU into error mode.

Assuming there are no errors the system to host command strobe 70 is then raised and the system returns to Time Frame 1 designation to begin a synchronization operation to convey success of the data transfer to the host computer. An error will prevent synchronization operation, thus signalling the host computer to retry the transfer.

Figure 7:
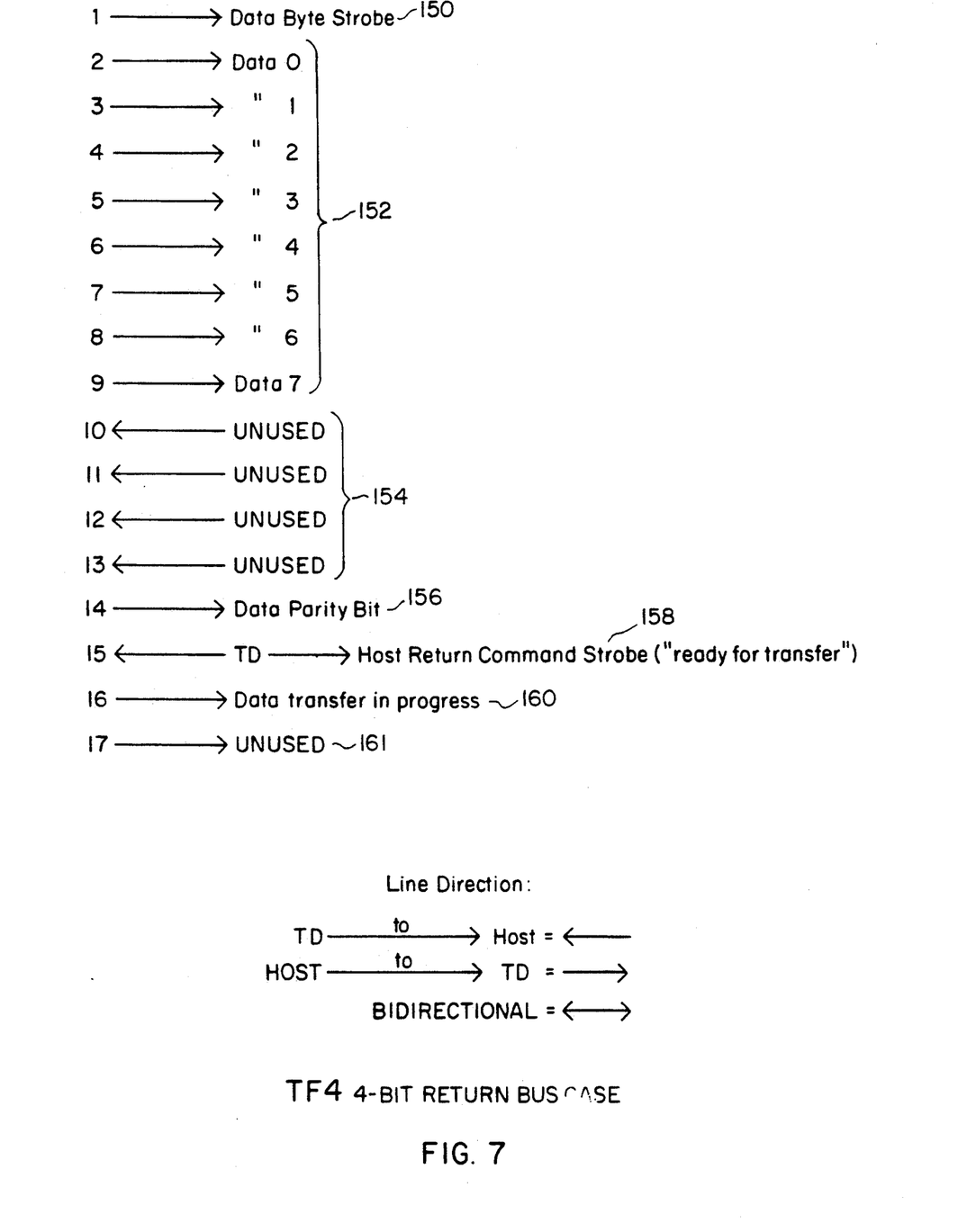
FIG. 7 is a diagram of the parallel port line designations for data block transmissions from the computer in Time Frame 4 described in FIG. 6 for the 4-bit return bus case.
Figure 12:
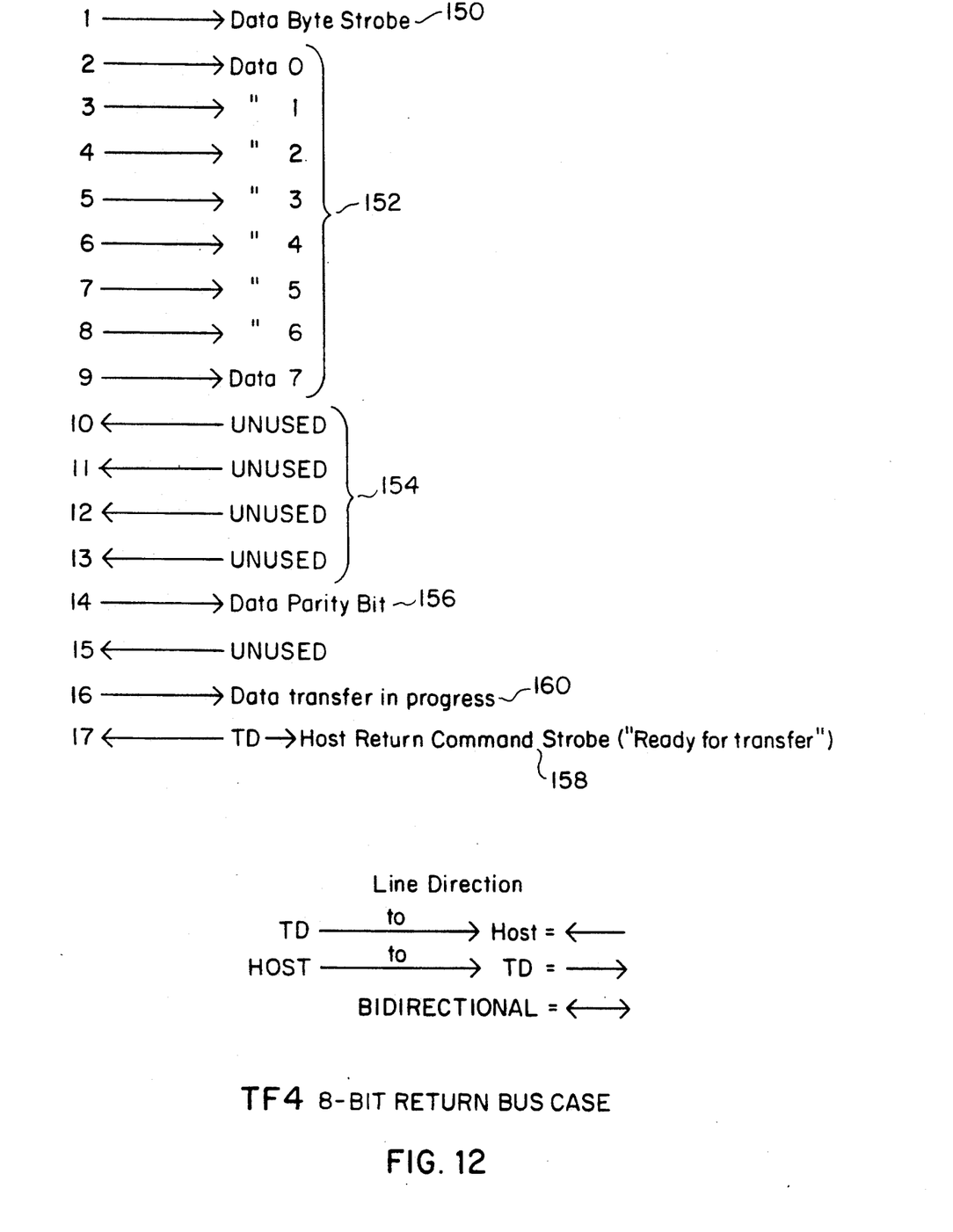
FIG. 12 is a diagram of parallel port line designations for data block transmission from the computer in time frame 4, as described in FIG. 6, for the 8-bit return bus case.

The line designations utilized for a Time Frame 4 configuration are shown in FIG. 7 and FIG. 12 for the 4-bit return bus and 8-bit return bus cases. The designations used differ significantly from those of Time Frames 1, 2 and 3. Line 1 is designated for the data byte strobe 150, asserted by the host computer each time it transmits a byte from a block.

Lines 2 through 9 carry the 8 bit data byte 152 from the computer to the system. Since the system in this example of Time Frame 4 only transmits data from the computer to the system, the designated return lines 10 through 13 are unused 154. The data byte parity bit 156 is transmitted with each byte from the block on line 14.

The system-to-host command strobe 158 is located on lines 15 and 17 for the 4-bit and 8-bit return bus cases respectively. The data transfer in procress signal 160, is carried on line 16. Line 17 is unused 161 in the 4-bit return bus case.

Figure 8:
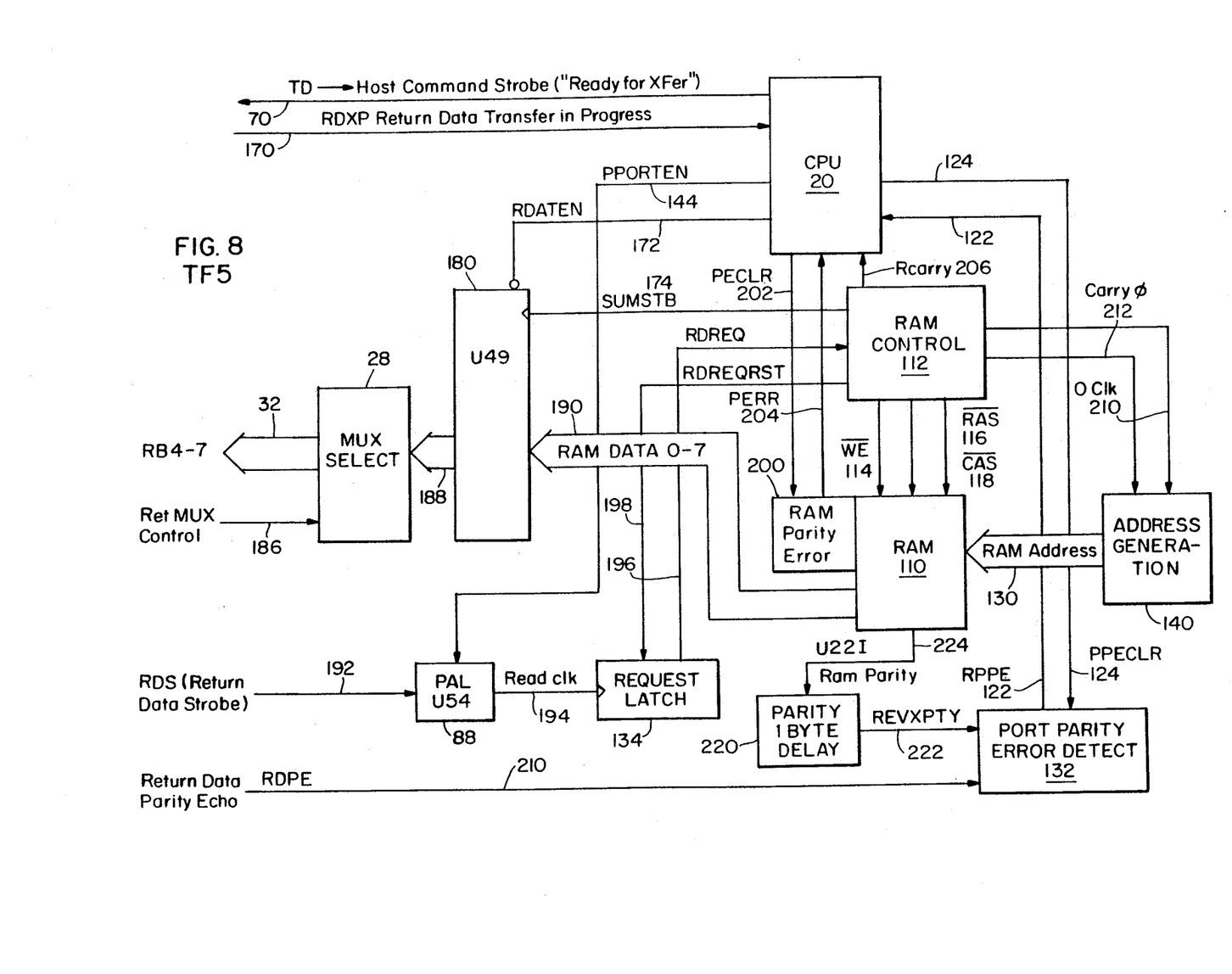
FIG. 8 is a block diagram of the active circuitry for data block communication in the Time Frame involving data block transmission to the computer (Time Frame 5)

The final time frame described in this example is Time Frame 5 designated for transfer of data blocks from the system to the host computer. The circuitry for implementing this state is shown in FIG. 8. The system in a Time Frame 5 designation utilizes the same RAM 110 and CPU 20 systems as those applicable to Time Frame 4. However, RAM parity errors are only detected upon reading data out of RAM. Thus, the CPU initially sends a clear signal 202 to the integrated RAM parity error circuit 200. As in Time Frame 4, the CPU will subsequently transfer a parallel port enable command 144 to the programmed array logic 88 allowing a host computer generated return data strobe 192 to be read by the system in the form of a read clock signal 194. The read clock signal is stored in the request latch 134 until the RAM controller 112 transfers a signal 198 to the request latch 134 to indicate that it has performed the requested read thereby clearing the request latch. At this point the latch responds by transferring read request signals 196 back to RAM controller 112. In response to the read request signal 196, bytes of data are transferred along the return data bus 190 to an 8-bit latch 180 similar to that utilized for a Time Frame 3 data byte return. The Time Frame 3 latch 26 of FIG. 3 is in fact disengaged at this time by bringing the command enable signal back to a high value. At the same time the latch 180 for data block byte transfer is enabled by the CPU 20 using a low value signal 172. Prior to byte transfer to the latch, the CPU signals the host computer that a transfer is ready to begin 70. The host confirms receipt of this signal by returning a return data transfer in progress signal 170. The host computer then begins to strobe the return data strobe signal 192 signalling the RAM controller 112 to read the data block in RAM. The address generator 140 advances through the addresses as each read signal is received, in response to the address controller's clocking signals 210 and 212. Similarly, the latch 180 releases a byte each time the RAM controller 112 transfers a strobe signal 174.

The latch 180, like that used in Time Frame 3, transfers a byte of data to the 4-bit multiplexer 28. This 4-bit multiplexer, in response to a return multiplexer control generated by the host, then successively transfers the upper and lower four bits of the byte to the return data bus lines 32.

Because not enough return lines can be relied upon to exist in a standard computer to send a parity signal back to the host computer along with the other four parallel bits of data, the host computer generates its own parity bit signal 210 upon receipt of a byte from the system. This bit is, in substance, a return parity echo. Upon the next read request strobe 192, the echoed parity bit is compared to the bit for the previous read request that was transferred via a line from the RAM 224 to a parity delay storage latch 220. The comparison occurs in the same port parity error detection circuit 132 utilized in Time Frame 4. However, now the parity bit checked lags 1 bit behind that being read by the system.

Once the full block transfer to the host computer is completed, the host computer signals the system by placing the return data transfer in progress signal 170 high. The CPU then begins an error checking process similar to that in Time Frame 4 beginning with a reading of the RAM controller carry signal 206. If this signal does not show a high value, then exactly 512 bytes were not requested and an error is noted by the CPU 20. The CPU then reads the signal 204 generated by the RAM parity error circuit 200 to check for RAM errors. If this signal displays a high value, then the RAM has erroneously stored data and the CPU notes an error.

Finally, the CPU checks for parallel port transmission errors between the system and host computer by reading the signal 122 generated by the port parity error detection circuit 132. If this signal shows a high value, then a transmission error has occurred and the CPU will note it by entering an error mode.

Subsequent to error checking, the CPU disables the return data strobe 192 through an instruction to the programmed array logic 88 using a high value for the parallel port enable signal 144. The CPU then sets the value of the system to host command strobe 70 high to signal the host computer that the transfer is complete.

Assuming no errors were detected, the system enters Time Frame 1 and begins a synchronization operation. If, however errors have occurred, the system does not synchronize; rather it awaits a command, by default signifying to the host that an error is present.

Figure 9:
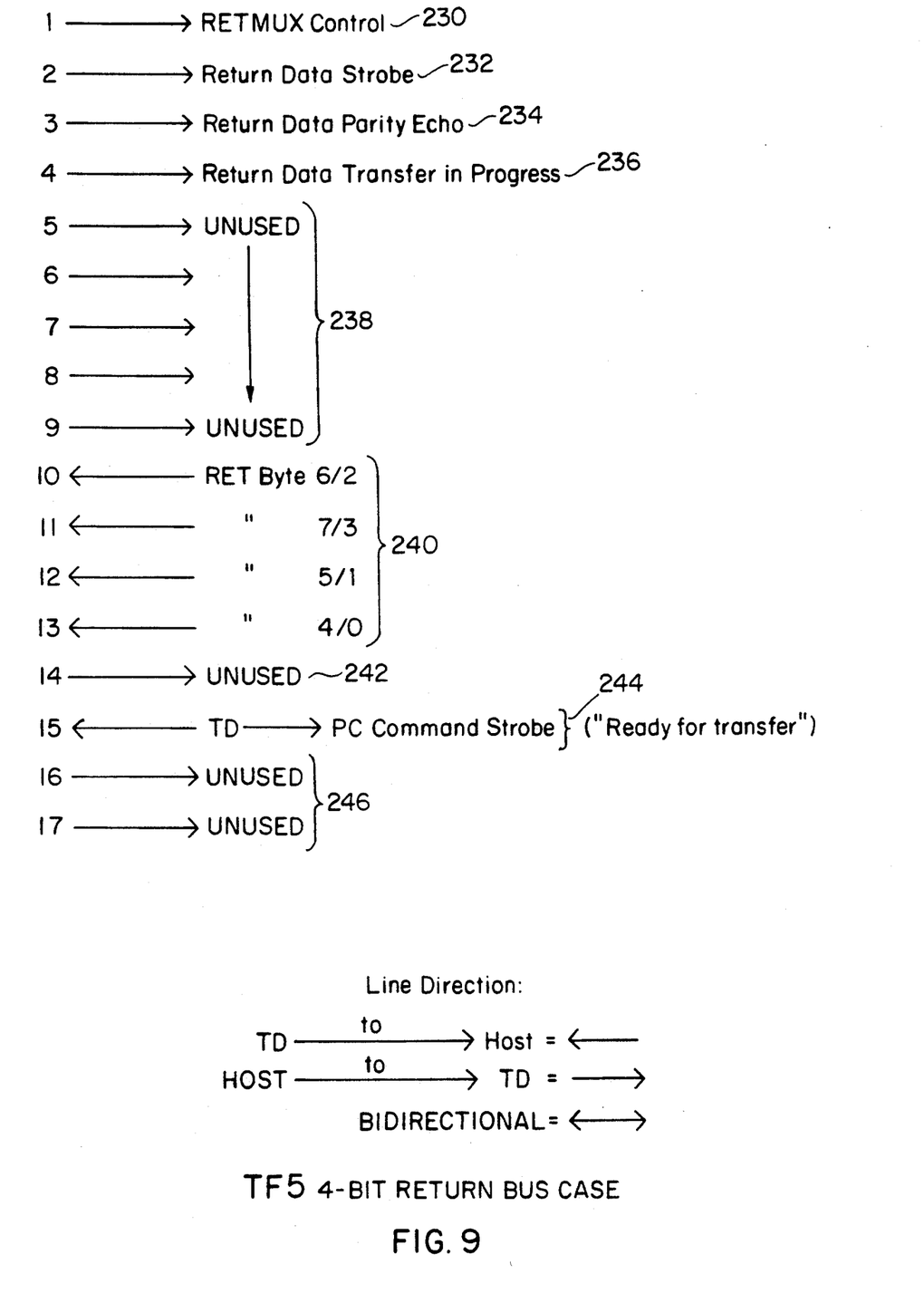
FIG. 9 is a diagram of the parallel port line designations for data block transmissions to the computer in the Time Frame 5 described in FIG. 8 for the 4-bit return bus case.
Figure 13:
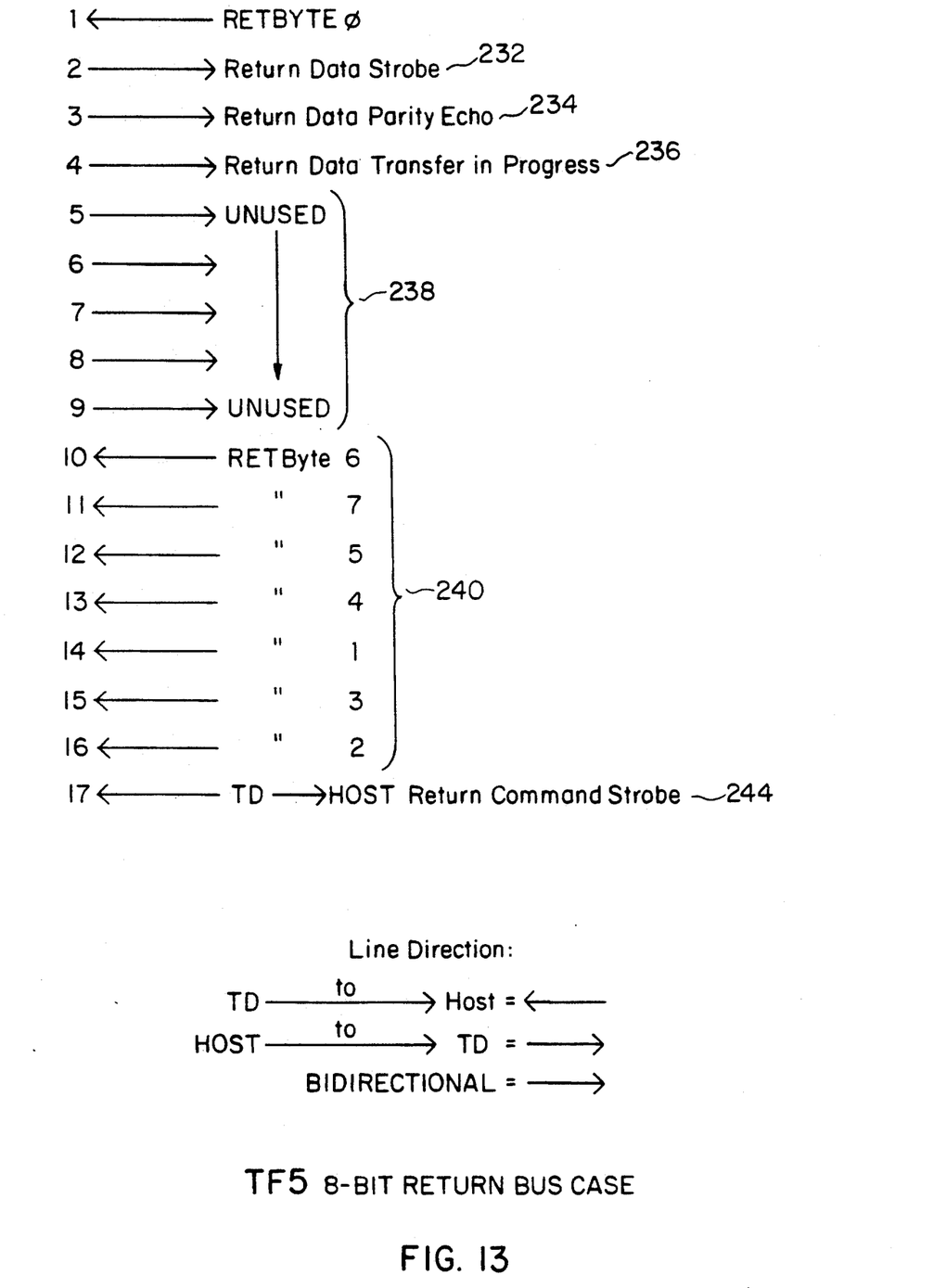
FIG. 13 is a diagram of the parallel port line designations for data block transmissions to the computer in time frame 5, as described in FIG. 8, for the 8-bit return bus case.

The pin designations for the parallel port for Time Frame 5 of this example are disclosed in FIG. 9 and FIG. 13 for the 4-bit and 8-bit return bus cases, respectively. A return multiplexer control 230 similar to that of Time Frames 1, 2 and 3 is located on line 1 for the 4-bit return bus case. The return data strobe 232 for host request of bytes is located on line 2. The return data parity echo signal 234 generated by the host to allow parity in transmission from the system despite the lack of sufficient lines is placed on line 3. The handshake signal signifying return data transfer in progress 236 from the host is placed on line 4. Since data is not transferred from the host computer in this Time Frame, the other host-to-system parallel lines 5 through 9 are unused 238. The 4 bit multiplexed return lines 240, lines 10 through 13, are placed in the same location as that for Time Frames 1, 2 and 3 for the 4-bit return bus case. The return lines for the 8-bit return bus case are 1 and 10–16. Line 14 from the host is unused 242 for the 4-bit return bus case. The system to host computer command strobe 244 is placed on the return line 15 and 17 for the 4-bit and 8-bit return bus cases, respectively. Lines 16 and 17 from the host are unused 246 in the 4-bit return bus case.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A parallel port computer interface system for interconnecting a host computer and peripheral device by means of a standard parallel port, generally utilized for a printer interface, said standard parallel port comprising a group of parallel port lines having a plurality of fixed output lines, a plurality of fixed input lines, and a plurality of fixed bidirectional lines, said parallel port computer interface system comprising:

means for establishing a plurality of bidirectional communication cycles, each of said communication cycles having a plurality of consecutive time frames for said group of parallel port lines of said standard parallel port;

means for transferring command bytes to said peripheral device from said computer and from said peripheral device to said computer during at least some of said time frames of said communication cycle and data blocks to said peripheral device from said computer and from said peripheral device to said computer during at least some other of said time frames of said communication cycle;

means for designating a function of said group of parallel port lines as command byte parallel port lines and as data block parallel port lines when performing said transferring of said command bytes and said data blocks, respectively, wherein said command bytes and data in said data blocks required a different number of said parallel port lines;

means for dynamically redefining the functional designation of said group of parallel port lines during each of said consecutive time frames of each of said communication cycles to accommodate the transfers to and from said computer of said command bytes and to and from said computer of said data blocks in said plurality of communication cycles;

means for storing said command bytes and said data blocks be sent and received; and means, responsive to said means for redefining, for conditioning said means for storing as a function of the designation of the group of parallel port lines during each of said time frames of each of said communication cycles.

2. The parallel port computer interface system of claim 1 in which said means for redefining includes means for designating said parallel port lines to allow said command bytes to represent during at least one of said time frames a plurality of system commands, to be sent to and from said computer to validate for correctness of said command bytes and data blocks and synchronize said transfer between said computer and said interface system.

3. The parallel port computer interface system of claim 1 in which said means for redefining includes means for defining said parallel port lines to allow said command bytes to be sent from said computer.

4. The parallel port computer interface system of claim 1 in which said means for redefining includes means for enabling said parallel port lines to allow said command bytes to be sent to said computer.

5. The parallel port computer interface system of claim 1 in which said means for redefining includes means for dedicating said parallel port lines to allow said data blocks to be sent from said computer.

6. The parallel port computer interface system of claim 1 in which said means for redefining includes means for resolving said parallel port lines to allow said data blocks to be sent to said computer.

7. The parallel port computer interface of claim 1 in which said means for transferring includes means for transmitting said command bytes and receiving, to check for transmission errors, an echo of said command bytes during the same said time frame over the same set of said parallel port lines.

8. The parallel port computer interface of claim 7 in which said means for transmitting includes means for multiplexing some of said parallel port lines carrying one of said command bytes, and said echo of said command bytes, to allow transmission on fewer lines.

9. The parallel port computer interface of claim 1 in which said means for redefining includes means for including at least one of said parallel port lines to carry parity bits along with said data blocks transmitted from said computer.

10. The parallel port computer interface of claim 1 in which said means for tranferring includes means for specifying a line to carry echo parity bits from said computer in response to and relative to a transfer of said data blocks to said computer.

11. The parallel port computer interface of claim 10 in which said means for specifying includes means for generating said echo parity bits in response to and relative to a transfer of said data blocks to said computer.

12. The parallel port computer interface system of claim 10 in which said means for specifying include means for determining whether the transmission of said data blocks was correct based upon said echo parity bits.

13. The parallel port computer interface system of claim 1 in which said means for transferring includes at least one independent central processing means for communicating with at least one said host computer and at least one said peripheral device.

14. The parallel port computer interface system of claim 1 in which said means for conditioning includes means for inputting into said storage successive bytes of said data blocks directly from said parallel port lines.

15. The parallel port computer interface system of claim 1 in which said means for conditioning includes means for outputting from said storage successive bytes of said data blocks directly onto said parallel port lines.

16. The parallel port computer interface system of claim 15 in which said means for outputting further includes means for dividing said successive bytes of said data blocks to allow multiplexing of some of said parallel port lines carrying said data blocks to said computer, to allow transmission on fewer lines.

17. The parallel port computer interface system of claim 1 in which said means for storing includes dynamic random access memory (RAM) means.

18. The parallel port computer interface system of claim 1 in which said means for conditioning includes RAM control means.

19. The parallel port computer interface system of claim 18 in which said means for conditioning includes means for addressing nine bits of both rows and columns of random access memory addresses in response to said RAM control means.

20. The parallel port computer interface system of claim 1 in which said means for conditioning includes means for latching said command bytes and bytes of said data blocks to regulate the time of their transfer between said parallel port lines and said means for storing.

21. The parallel port computer interface system of claim 1 in which said means for redefining includes means for delineating lines to carry command and data strobe signals to provide an interactive handshaking function between said interface system and said computer.

* * * * *